April 8, 1952     J. G. CATRANIS     2,591,781
KNEE LOCK FOR ARTIFICIAL LEGS AND CONTROL THEREFOR Filed March 23, 1949     2 SHEETS—SHEET 2

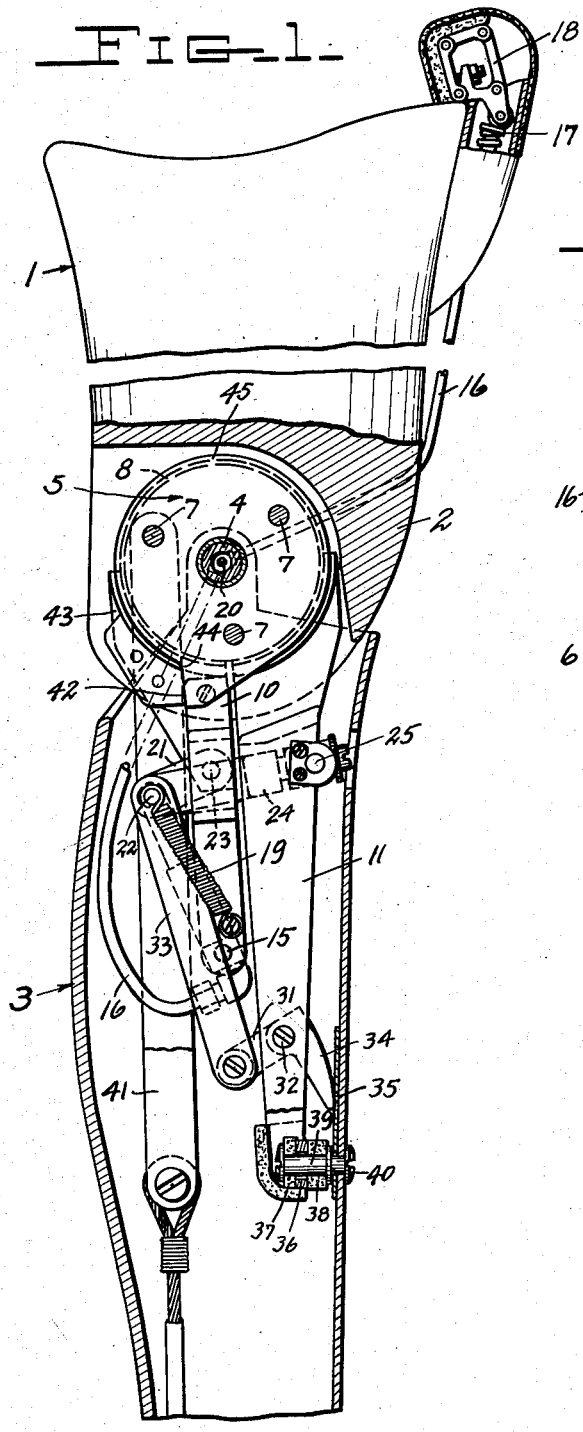
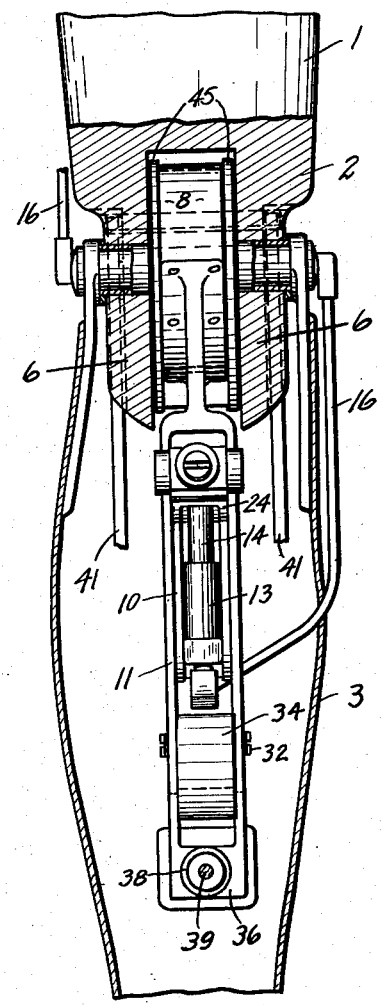

INVENTOR:
John G. Catranis,
BY
Bodell & Thompson,
ATTORNEYS.

Patented Apr. 8, 1952

2,591,781

UNITED STATES PATENT OFFICE 2,591,781

KNEE LOCK FOR ARTIFICIAL LEGS AND CONTROL THEREFOR

John G. Catranis, Syracuse, N. Y.

Application March 23, 1949, Serial No. 83,028

5 Claims. (Cl. 3—2)

This invention relates to artificial legs for above-the-knee amputees, and particularly to knee locks, and has for its object a knee lock and control therefor, which knee lock comprises a friction brake operable by the amputee automatically by the tensioning of muscles used naturally during the walking cycle to partly apply the brake and by a change in the angularity of the stump socket and the lower leg, so that the leg tends to bend at the knee joint, to fully apply the brake, or knee lock, successive to the part application by the muscles. The control by the amputee is automatic, or involuntary, during the walking cycle.

The knee lock here shown is of the type embodying an actuator, as a motor of the cylinder and piston type, which is energized by tensioning of the thigh muscles during part of the walking cycle. The muscle control per se forms no part of this invention.

The feature of the invention is a second actuator acting in conjunction with or successive to the motor actuator to more fully apply the knee lock brake, and controlled by the changes in the angles of the stump and socket and the lower leg about the knee joint when taking a step with the artificial leg.

The invention consists in the novel features and in the combinations and constructions hereinafter set forth and claimed.

In describing this invention, reference is had to the accompanying drawings in which like characters designate corresponding parts in all the views.

Figure 1 is a fragmentary side elevation, partly in section, of an artificial leg embodying this invention.

Figure 2 is a front view of the knee lock looking to the left in Figure 1, the bracket at the lower end of the stump socket being shown in section.

Figure 3:
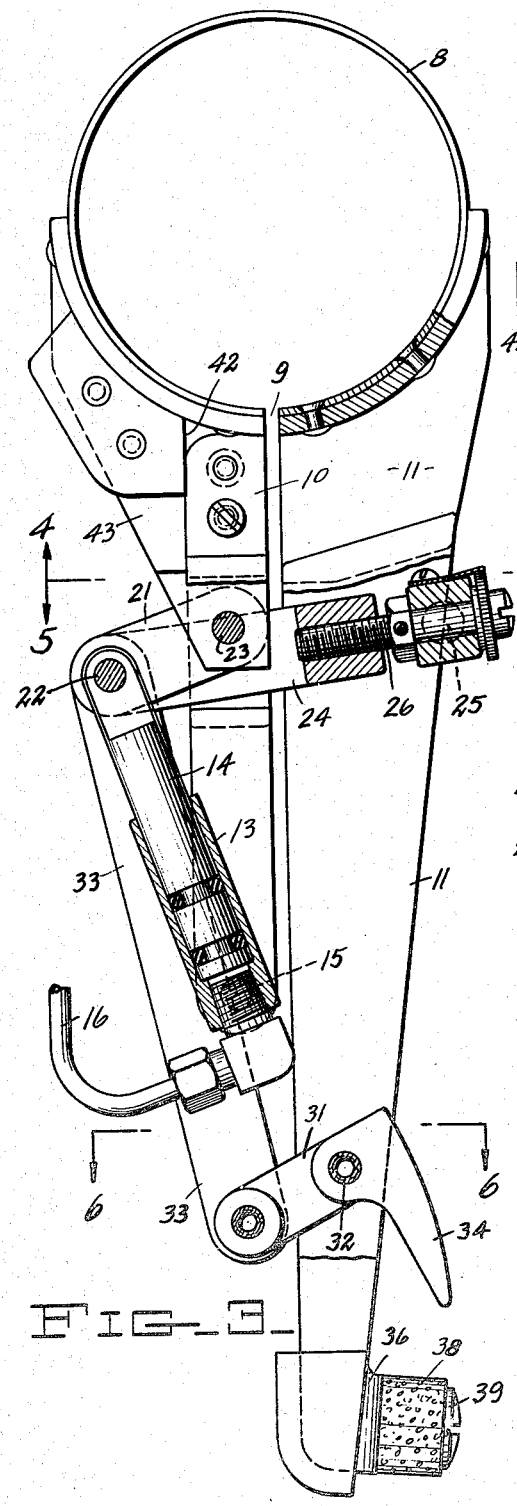
Figure 3 is an enlarged elevation, partly in section, of the knee lock mechanism shown in Figure 1.
Figure 4:
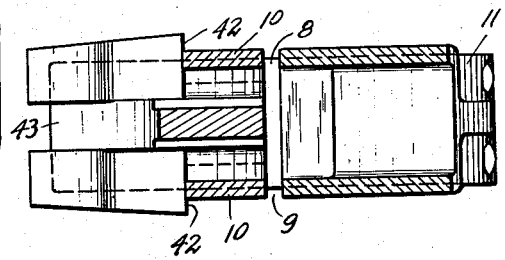
Figure 5:
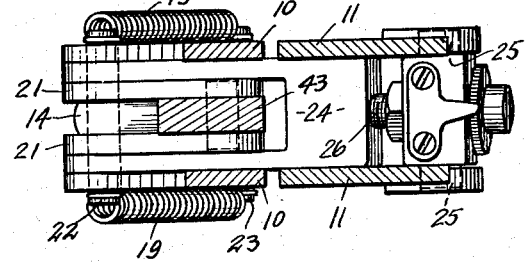
Figure 6:
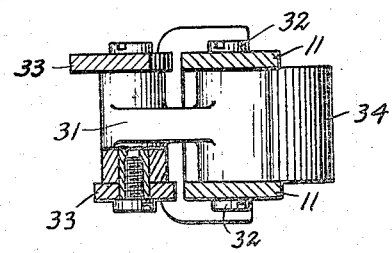

Figures 4, 5 and 6 are sectional views taken respectively on lines 4—4, 5—5 and 6—6, Figure 3.

This knee lock mechanism comprises a friction brake member, as a drum, fixed to the socket of the leg coaxial or concentric with the knee pin hinging the socket to the lower leg structure, a second friction brake member coacting with the first brake member or drum, and mechanism for operating the second brake member to apply the second brake member to the first brake member or drum in two stages, one stage being effected by an actuator controlled by means operated by the tensioning of the thigh muscles of the stump of the amputated leg when the artificial leg is lifted forward about the hip joint by the amputee during the walking cycle so the leg starts to bend freely at the knee pin or joint when the foot is lifted off the floor, and the second stage being effected by a second actuator to fully apply the brake to prevent collapsing of the leg at the knee joint when the artificial foot is placed by the amputee on the floor at the end of the forward swing of the leg when the weight of the body is transferred from the natural leg to the artificial leg.

1 designates the socket as a whole for receiving the stump of the amputee, this including a knee bracket 2 at the lower end of the socket. 3 designates the shank or lower leg structure as a whole, the lower leg being hinged to the socket, or the bracket 2 thereof, by a knee joint pin 4.

5 is the fixed member or brake drum of the knee lock mechanism, the drum being mounted between bifurcations 6, Figure 2, of the bracket 2 concentric or coaxial with the knee pin 4, the drum being fixed to the bracket 2 as by transverse pins 7.

8 is a second brake member coacting with the drum, this including a band enclosing the brake drum, the band being split transversely at 9 and having a pair of opposing members or arms 10 and 11 depending therefrom at opposite sides of the split 9 into the lower leg structure, the members or arms 10 and 11 being opposed to each other and movable toward each other to frictionally contract the band 8 on the drum 5.

The mechanism for initially moving the members or arms 10 and 11 toward each other comprises an actuator, as a motor 13, including a movable element 14 which is connected through motion transmitting means to the members or arms 10 and 11 to clamp them toward each other.

The motor is here shown as a cylinder and piston, the piston being the movable element and having its rod connected to the motion transmitting means. The cylinder of the motor 13 is shown as pivoted at 15 to the lower end of the arm 10. The motor is actuated by a hydraulic fluid in a system here shown as controlled by the thigh muscles. The control means comprises a conduit 16 connected at its lower end to the cylinder 13 and at its upper end to a chamber in which a spring pressed plunger works, the plunger having a stem 17 acted upon by a lever arrangement 18 sensitive to the tensioning and relaxation of the quadriceps tendon of the stump of the amputee, the lever arrangement being located at the upper edge of the socket 1. Tensioning of the quadriceps tendon, or thigh muscle, causes the fluid to be pressed downward in the pipe 16 and hence, actuate the piston of the motor 13 upward. Relaxation of the thigh muscles relieves the pressure on the fluid in the pipe 16 and permits the piston to return to its starting position under the influence of springs 19. The conduit 16 includes a passage 20, Figure 1, extending axially of the knee pin 4.

The motion transmitting means actuated by the motor 13, or the piston 14 thereof, comprises a link 21 pivoted at one end at 22 to the upper end of the rod of the piston 14, and at its other end pivoted at 23 to the arm 10 of the brake band 8. It also comprises a link 24 pivoted at one end at 22 to the upper end of the rod or piston 14, and at its other end at 25 to the arm 11 of the brake band 8. The links 21 and 24 are normally arranged so that the pivot 23 is above a straight line passing through the pivots 22 and 25. When the motor 13 is energized and the piston moves upward, the pivot 22 moves upward carrying the link 24 upward about the pivot 25, so that the pivot 23 of the link 21, in effect, moves towards said straight line and thus acting toggle fashion clamps the arms 10 and 11 toward each other, partly contracting the brake band 8 on the brake drum 5, that is partly applying the brake of the knee lock. The link 24 is in two sections connected by an adjusting screw 26 operable to extend or shorten the link to adjust the knee lock mechanism to the amputee. The links 21 and 24 are formed double or bifurcated, as shown in Figure 5. The detail construction of the link per se by which its adjustability is effected forms no part of this invention.

The second actuator operated by the change in the angularity of the socket 1 and lower leg structure 3 about the knee joint comprises an angle lever 31 pivoted at 32 to the lower portion of the arm 11 of the brake band 8, this arm being longer than the arm 10 and the lever 31 being located below the level of the motor 13 which is carried by the arm 10. One arm of the lever 31 is connected by a double or bifurcated link 33 to the rod of the piston 14 and to the links 21 and 24 at the pivot 22. The other arm of the lever 31 is formed with an angular head 34 which at times fulcrums at 35 on the inner face of the shank or lower leg structure, and when so fulcruming, actuates the lever 31 about its pivot 32 to push the link 33 upward and hence, move the links 21 and 24 upward in addition to the upward movement imparted thereto by the piston rod of the motor 13.

The lower end of the arm 11 is provided with a transverse lug 36 which extends between two resilient cushions, as sponge rubber washers 37 and 38 mounted on a stud 39 which is secured at 40 to the shank of the leg structure. These cushions are usually of sponge rubber and function as will be presently described.

There is a link connection designated generally 41 anchored at its upper end to the socket, as to one of the pins 7, and connected at its lower end to the foot, not shown. This link forms no part of the invention.

A stop joint is provided for limiting pivotal movement of the lower leg about the knee joint beyond straightened position. The stop joint consists of shoulders 42 on a bracket 43 connecting the arm 10 to the brake band 8, and shoulders 44 provided on the periphery of disks 45 on opposite ends of the drum 5 and secured thereto by the pins 7. When the leg is bent at the knee joint normally, the shoulders 44 separate from the shoulders 42, but when the leg is straightened the shoulders 44 abut against the shoulder 42. The mechanism for applying the brake band to the brake drum in two stages thus includes the motor or actuator consisting of the cylinder and piston 13, 14, and the motion transmitting means consisting of the links 21 and 24 acting on the depending arms 10 and 11 of the second brake member or brake band to operate the brake band during the first stage, and the lever 31 is the second actuator to operate the brake during the second stage of said mechanism to apply the brake when the angular head 34 engages a fixed point or fulcrum, as the inner face of the wall of the shank of the lower leg, this occurring when the foot is again placed on the floor at the end of the forward swinging of the artificial leg. The automatic two stage operation of the brake characterizes this invention.

In operation, assume that the amputee starts to take a step on the artificial leg from standing position in which the feet are together. The amputee shifts his weight over onto the natural leg, lifting the artificial leg by raising the stump of the artificial leg and hence, swinging the socket forwardly about the hip joint, thus taking the artificial foot off the floor. This operation slightly tensions the thigh muscle and therefore energizes the motor 13 so that the brake band 8 is slightly contracted on the brake drum 5. The braking force, being thus only partly applied, holds the artificial leg from too free swinging or pendulum movement with the artificial leg slightly bent at the knee joint while the body of the amputee is progressing forward while supported on the natural leg. The artificial leg at the same time swings forward to take a new step, and the heel of the artificial foot placed on the floor. As the artificial leg now tends to bend at the knee joint under the applied weight of the body, the lever or second actuator 31 fulcrums at 35 on the inner wall of the shank structure and applies an upward pressure to the link 33 which, in turn, additionally actuates the links 21, 24, farther toward the straight line passing through the pivots 22, 25, thus more fully applying the brake band 8 to the brake band 5 to prevent collapse of the artificial leg at the knee joint. At the end of the step on the artificial leg, the artificial leg inclines rearwardly from the hip joint. The amputee now shifts his weight again to the natural leg and in so doing lifts the artificial leg slightly from the hip so that the artificial leg can be swung forwardly as before, to take a new step.

When the brake is being partly applied by the motor 13 under the action of the thigh muscle when the leg is bending at the knee joint, the arms 10 and 11 are pulled toward each other by the action of the toggle links 21, 24. This slight movement moves the head 34 of the second actuator lever 31 away from its fulcrum point 35, the lug 36 compressing the buffer cushion 37. When the weight is applied to the artificial foot, the leg starts to bend further, and the angularity between the socket 1 and lower leg structure changed to a slightly greater angle, the arm 11 swings counter-clockwise slightly against the cushions 28, bringing the head 34 of the second actuator lever 31 against the fulcrum point 35, causing the second actuator or lever 31 to be actuated and transfer its movement through the link 33 to the links 21, 24, and pull the arms 10 and 11 further toward each other to more fully apply the brake of the knee lock. It will be borne in mind that during the change in angularity between the socket 1 and the lower leg 3, the brake drum 5, which is anchored to the bracket 2 at the end of the socket, has in effect a slight turning movement in a counter-clockwise direction relative to the lower leg structure. Thus, during the walking cycle at any time during the lifting of the stump and socket about the axis of the hip joint, the brake will be partly applied due to the action of the thigh muscle and that when the weight is applied to the artificial leg, when bent slightly about the knee joint, the knee lock will be applied during further bending slightly at the knee joint with greater force to keep the artificial leg from collapsing. There are other conditions encountered in the use of the artificial leg, as when ascending or descending ramps, or steps, and in sitting down, where the angle of the socket at the hip joint will be in a straight line when the lower leg is at an angle to the socket. Under such conditions, the knee lock will be fully locked when the weight is applied to the artificial leg and only partly applied by the tensioning of the thigh muscles when little or no weight is applied to the artificial leg. Thus, to release the knee lock when the artificial leg is bent, the amputee shifts his weight off the artificial leg. Under any condition, the application of the brake of the knee lock is controlled by the successive action of the thigh muscle and slight bending at the knee joint when the weight of the amputee is first applied on the bent leg.

What I claim is:

1. A knee lock for an artificial leg which comprises a stump socket, a lower leg, and a knee pin hinging the lower leg to the inner end of the socket, the knee lock comprising a friction brake drum rigid with the socket concentric with the knee pin, a second brake member encircling the first brake member and suspended therefrom, the second brake member being a split band and having spaced opposing arms depending from opposite sides of the split of the band into the lower leg, motion transmitting means between and acting on said arms to contract the brake band on the first brake drum, first and second actuators, a first actuator having a movable element, a control carried by the socket and operated by the tensioning and relaxation of the tendons of the stump of the amputee, means for transferring the motion of the control member to the movable element of the first actuator, a second actuator shiftably carried by one of the depending arms and initially spaced from a fixed part of the shank of the lower leg and located to engage said part during change in angular relation of the socket and the lower leg about the knee pin upon lifting of the socket upward about the hip joint of the amputee from straight position to forward inclined position and hence shift the angular position of the depending arms relative to the knee pin and the lower leg during bending at the knee pin, and shift the second actuator against the fixed part of the shank, and motion transmitting connections between the second actuator and said motion transmitting means.

2. The knee lock of claim 1 in which the second actuator is a lever pivoted to one of said depending arms, and one end of the lever moves into engagement with said fixed part and fulcrums thereon when the weight of the amputee is applied to the stump after the stump has been lifted about the hip joint.

3. The structure set forth in claim 1 in which the second actuator comprises a lever pivoted to one of the depending arms of the second brake member, and the motion transmitting connections comprises a link connecting the actuator lever to the movable element of the motor of the first actuator, and yielding cushioning means located between the fixed part of the lower leg structure and the arm of the depending arm of the second brake member to which the second actuator is pivoted.

4. A knee lock for artificial legs which comprises a stump socket, a lower leg and a knee pin hinging the lower leg to the lower end of the socket, the knee lock comprising a friction brake drum fixed to the socket coaxial to the knee joint, a split brake band enclosing the drum and having opposing arms depending into the lower leg from opposite sides of the split of the band and movable toward each other to apply the second brake band to the drum, a motor actuator having a movable element, motion transmitting means between the depending arms and the movable element comprising a link pivoted at one end to the movable motor element and at its other end to one of said arms, a second link pivoted at one end to the motor element and at its other end to the other of said arms, the pivot connecting the first link and the first of said arms being arranged at one side of a straight line passing through the pivot between the first link and said movable motor member and through the pivot of the second link, and the other of said arms and movable toward said straight line during the energization of the motor element, a second actuator shiftably carried by the other of said depending arms and initially spaced from a fixed part of the lower leg and shiftable by the movement of said depending arms and brake band about the brake drum against the fixed part in the lower leg when the weight of the amputee is applied to the lower leg and the lower leg is lifted from the hip joint and the foot is off the floor so that when the foot is planted on the floor the second actuator, engaging said fixed part in the lower leg, is shifted to apply the brake band to the drum, a control carried by the socket in position to coact with the thigh muscles of the stump and motion transmitting connections to transfer the movement of the last control to the motor actuator.

5. A knee lock for an artificial leg which comprises a stump socket, a lower leg, and a knee pin hinging the lower leg to the lower end of the socket, the knee lock comprising a friction brake drum rigid with the socket concentric with the knee pin, a split brake band normally loosely enclosing the drum and spaced opposed arms depending from opposite sides of the split of the band into the lower leg, motion transmitting means coacting, when operated, with said arms to contract the band on the drum, a control carried by the socket to coact with the stump during tensioning and relaxation of the thigh muscles of the stump during the walking cycle, a first actuator, connections between the control and the first actuator to transfer the movement of the control to the first actuator and said motion transmitting means, a second actuator comprising a shiftable member carried by one of the depending arms and normally spaced from a fixed point in the lower leg and movable into engagement with the fixed point during the walking cycle and bending of the leg at the knee pin, and motion transmitting connections between said second actuator and said motion transmitting means to transfer the sliding movement of the second actuator to the motion transmitting means when the second actuator engages said fixed point and the weight of the amputee is applied to the artificial leg.

JOHN G. CATRANIS.

REFERENCES CITED

The following references are of record in the file of this patent:

UNITED STATES PATENTS

| Number | Name | Date |
|---|---|---|
| 1,283,093 | Critchley | Oct. 29, 1918 |
| 2,336,881 | Mortensen | Dec. 14, 1943 |

FOREIGN PATENTS

| Number | Country | Date |
|---|---|---|
| 175,193 | Great Britain | Feb. 16, 1922 |

OTHER REFERENCES

"Terminal Research Reports on Artificial Limbs," by Committee on Artificial Limbs of National Research Council. A copy was received in Div. 55, Nov. 13, 1947, pages 75, 76, 77.